United States Patent [19]

Mialon et al.

[11] 4,295,388
[45] Oct. 20, 1981

[54] CONTROL ROD AND A PROCESS FOR FITTING A CONNECTING MEMBER AT ONE END OF A CONTROL ROD

[75] Inventors: Jacques Mialon, Vitrolles; Bernard Lamarche, Velaux, both of France

[73] Assignee: Societe Nationale Industrielle Aerospatiale, Paris, France

[21] Appl. No.: 97,338

[22] Filed: Nov. 26, 1979

[30] Foreign Application Priority Data

Dec. 4, 1978 [FR] France ................................ 78 34111

[51] Int. Cl.³ .............................................. G05G 1/00
[52] U.S. Cl. ................................ 74/579 R; 29/469.5; 29/517
[58] Field of Search ...................... 29/469.5, 516, 517; 74/579 R

[56] References Cited

U.S. PATENT DOCUMENTS

| 2,595,695 | 5/1952 | Packer | 29/517 UX |
| 3,076,262 | 2/1963 | Rappleyea | 29/517 |
| 3,082,515 | 3/1963 | Rappleyea | 29/517 X |
| 4,211,589 | 7/1980 | Fisher | 29/469.5 |

Primary Examiner—Harold D. Whitehead
Attorney, Agent, or Firm—Merriam, Marshall & Bicknell

[57] ABSTRACT

The present invention relates to a process for fitting a connecting member at one end of a control rod, wherein a sleeve of resistant fibres impregnated with polymerizable resin is applied substantially against the inner wall of the end, the end is flattened at least until the portions of inner face of the sleeve, disposed on either side of the plane of flattening, are applied against one another, substantially completely obturating the section of the flattened portion of the tubular end, and the resin impregnating the sleeve is polymerized after flattening. The invention is more particularly applicable to the obtaining of light, resistant connecting rods, especially for aircraft.

7 Claims, 5 Drawing Figures

CONTROL ROD AND A PROCESS FOR FITTING A CONNECTING MEMBER AT ONE END OF A CONTROL ROD

BACKGROUND OF THE INVENTION

The present invention relates to a process for fitting a connecting member at one end of a control rod, and to a rod comprising at least one such arrangement. It is more particularly, although nonexclusively, applied to the manufacture of a control transmission rod for an aircraft, and in particular for an aerodyne.

The invention relates more directly to the manufacture of light, inexpensive connecting rods adapted to be inserted in flight control linkage systems for light aeroplanes or helicopters, in which the forces transmitted are relatively light but where, on the contrary, a considerable reliability is required.

In fact, it is known that, for transmitting movements or orders, it is often necessary to use linkage provided with connecting rods. These connecting rods generally comprise a tubular rod, at at least one end of which a connecting member is provided, such as a fork joint, an eye, a swivel joint, a fork, etc.

THE PRIOR ART

In known connecting rods, said connecting member is either fast with an end piece which is connected to said tubular rod, said connecting member therefore being connected to the rod by said end piece, or fixed directly on the end of the rod, which is prepared and machined especially to this end.

The present invention refers to this latter type of rods, which enables lighter and cheaper connecting rods to be obtained.

In connecting rods in which the connecting member is directly fixed on the end of the tubular rod, this rod is generally made of a deformable material, for example an aluminium alloy, and its end having to receive the connecting member is flattened on a rigid or deformable metallic intermediate piece, for example made of an iron alloy, intended to reinforce said end and to render the fitting of said connecting member resistant.

Due to the difference in the metals constituting the tubular rod and said intermediate piece, substantial galvanic cell appears between the metals, this causing considerable corrosion, despite the usual interposition of mastic or an insulating varnish before the end of the tubular rod is flattened.

Moreover, the metallic nature of said intermediate piece makes the connecting rod heavier. Finally, the ends of connecting rods produced in this way are not perfectly tight, this allowing humidity to enter said connecting rods, and promoting internal corrosion thereof, which is prejudicial to their strength and life in operation.

It is an object of the invention to remedy these drawbacks.

BRIEF DESCRIPTION OF THE INVENTION

To this end, the process according to the invention for fitting a connecting member at one end of a control rod constituted by a rod of which at least said end is tubular and made of deformable material, whereby said deformable tubular end is flattened on an intermediate piece intended for reinforcing said end and for rendering said connecting member resistant, said process being noteworthy in that said intermediate piece is constituted by a sleeve of resistant fibres impregnated with polymerisable resin and applied substantially against the inner wall of said end, said end is flattened at least until the inner face portions of said sleeve, disposed on either side of the plane of flattening, are applied against one another, substantially completely obturating the section of the flattened portion of said tubular end, and, after said flattening the resin impregnating said sleeve is polymerised.

The length of the sleeve of resistant fibres impregnated with polymerisable resin in chosen to be greater than the length of the tubular end portion intended to be flattened, so that its extends inside the connecting rod over a length at least equal to the portion of rod of evolutive section, i.e., the portion of the rod having a variable cross-section which, after flattening of the end, connects the flattened rod part to the rest of the rod and this extension of said sleeve is filled with a plug of plastic material which is deformable under moderate effort. Thus, at the moment of flattening, this deformable material avoids the appearance of folds in said portion of sleeve of evolutive section. Moreover, it is advantageous if said plug is made of a material of the closed cell foam type, for example a foam of polymethacrylimide. Thus, at the moment of hot polymerisation of the resin, the cells of the plug filled with air expand, with the result that the expanded plug on the one hand applies the corresponding portion of sleeve against the inner wall of the tubular end and, on the other hand, insulates the interior of the connecting rod from the flattened part, this preventing the expanded air contained in the connecting rod from driving out the resin in the course of polymerisation, which would cause porosities in said flattened sleeve and therefore a lack of tightness.

Moreover, the air contained in the tubular rod expands and exerts a pressure on said plug, this causing the sleeve to be applied against the inner wall of the end of the connecting rod.

To make said sleeve, said fibres impregnated with polymerisable resin are preferably wound on an inflatable bag and on said plug which is in line with same, after which said tubular end is fitted on the winding of the fibres and the bag is inflated to apply the corresponding sleeve portion against the inner wall of the tubular end of the connecting rod.

Under these conditions, due to the inflatable bag and to the plug, a good adherence is obtained of the sleeve against the inner wall of the tubular end.

To take into account the fact that, in the part of the rod of evolutive section, the plug cannot be completely compressed, a material which is intumescent, i.e., it expands when heated, is disposed between said plug and the sleeve part intended to be flattened.

For carrying out the process according to the invention, a device is provided which comprises a cylindrical annular inflatable bag mounted on a cylindrical mandrel, said mandrel comprising means for fixing said plug in line with said bag.

The invention also relates to a connecting rod wherein the fitting of a connecting member at at least one of its ends is obtained by carrying out the process.

DESCRIPTION OF THE DRAWINGS

The invention will be more readily understood on reading the following description with reference to the accompanying drawings, in which.

In these Figures, like references designate like elements.

DESCRIPTION OF THE PREFERRED EMBODIMENTS

Figure 1:
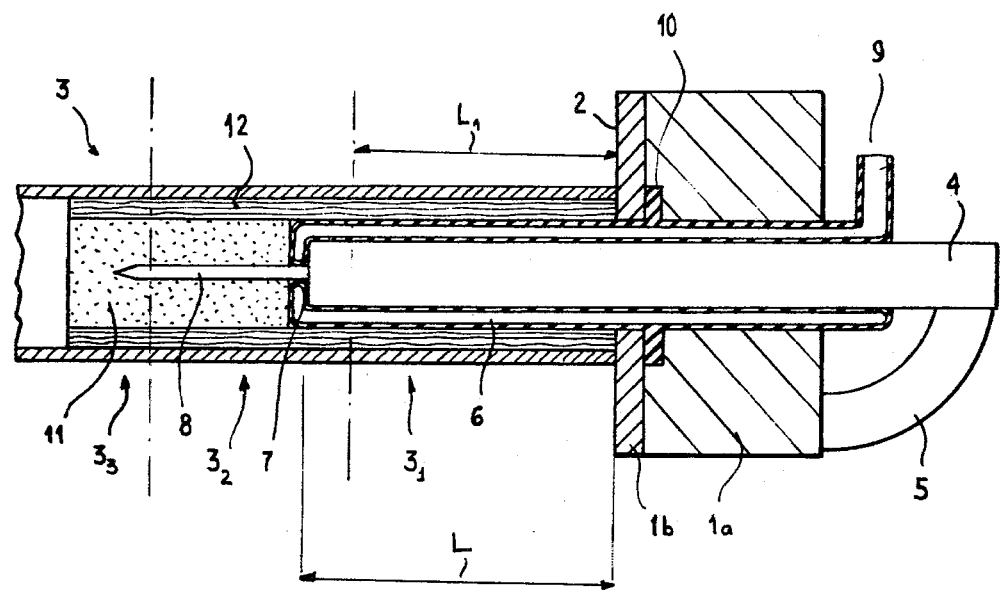
FIG. 1 schematically illustrates, in section, the carrying out of the process according to the invention.

Referring now to the drawings, the process according to the invention and illustrated in FIG. 1 employs equipment comprising a piece in two parts $1a$, $1b$, of which a flat face 2 may serve as stop for the end 3 of a metallic tubular rod intended to form the body of a control rod. This equipment further comprises a cylindrical mandrel 4, rendered fast with the piece $1a$, $1b$ via a piece 5 and at right angles to said face 2. On the mandrel 2 is disposed an inflatable bag 6, of annular and cylindrical form, surrounding said mandrel. The bag 6 comprises at one end a passage 7 for a needle 8, extending the mandrel 4 inside the tubular end 3 and disposed in the axis of said mandrel. At its other end, the bag 6 comprises a pressurised air inlet 9, whilst at the level of the joint between pieces $1a$ and $1b$, it presents a shoulder 10 pressed between said pieces and intended to connect said bag 6 with the equipment $1a$, $1b$, 4, 5, 8. The piece $1a$, $1b$ 4 and 5 may be made of light alloy, whilst the needle 8 may be made of stainless steel.

When the bag 6 is in deflated state, the end 3 may be fitted, with clearance, on said bag.

Figure 2:
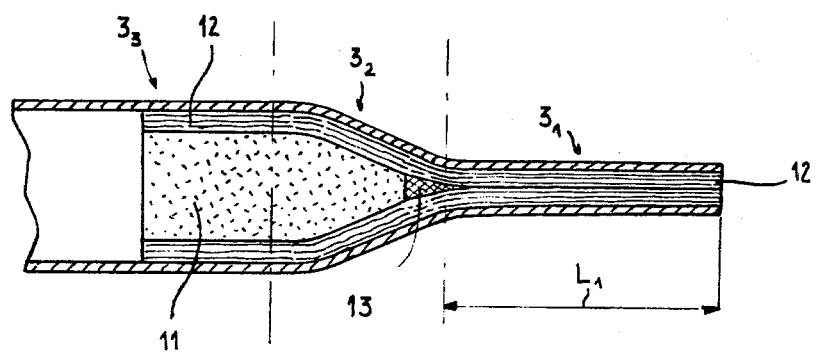
FIG. 2 shows in section the end of the connecting rod made according to FIG. 1, before polymerisation of the resin.

The length L of the mandrel 4, projecting with respect to face 2, is slightly greater than the length $L_1$ of the part $3_1$ of the tubular end 3 intended to be flattened (cf. FIG. 2 also), whilst the needle 8 is disposed in both parts $3_2$ and $3_3$ of the tubular end 3, the part $3_3$ not being affected by the subsequent flattening of part $3_1$, whilst the part $3_2$, of evolutive section after this flattening, connects the flattened part $3_1$ to the unchanged part $3_3$.

A cylindrical plug 11, disposed coaxially in line with the portion of bag 6 adjacent the needle 8, is force-fitted on said needle. Moreover, the diameter of the plug 11 is substantially equal to that of the bag 6 in the deflated state. The length of the plug 11 is such that it extends over portions $3_2$ and $3_3$ of the tubular end 3. The plug 11 is made of a plastics material of the closed cell foam type, for example the one known under the trade name of ROHACELL 71. This plug may be obtained by punching from a block of suitable thickness. A sleeve 12 of fabric of fibres preimpregnated with polymerisable resin is wound on the part of the bag 6 emerging from the face 2 and on the plug 11 extending said bag part. The number of turns of fabric is determined by the thickness desired for this sleeve, for example two or three times the thickness of the metallic tubular rod 3. This fabric may for example be a glass "kevlar" or carbon fabric, impregnated with epoxy resin.

The tubular end 3 of a metallic rod previously prepared and scoured (for example by sulfochromic scouring) is fitted on the sleeve 12 wound in this way.

Pressurised air is then introduced through the inlet 9 into the bag 6 so as to apply said wound fabric 12 against the lower wall of the tubular end 3 and to drive out the air, for a determined period of time, for example 30 seconds under a pressure of 2 da N/cm$^2$.

The bag 6 is then deflated and the assembly 3-11-12 is separated from assembly 1-4-6-8. A piece of film 13, intumescent when heated, is then introduced at the back of the cavity formed by the sleeve 12 applied against the tubular end 3 and obturated by the plug 11.

Figure 3:
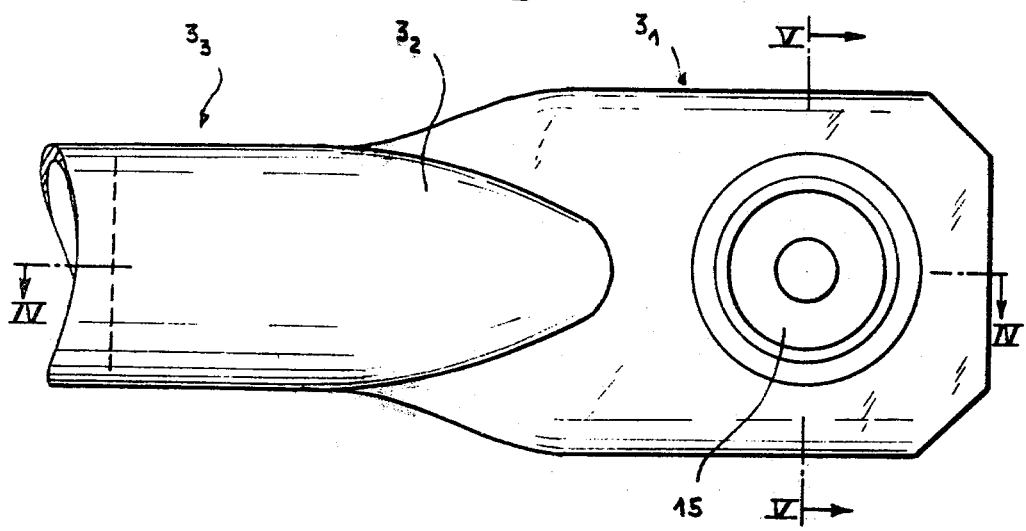
FIG. 3 is a plan view, on a different scale, of the end of the connecting rod according to the invention provided with its connecting member.

The tubular end 3 is then flattened and shaped by a press, with the aid of a mandrel, and acquires for example the shape which may be seen in FIG. 3. At this moment, the portions of inner face of the sleeve 12 located in the flattened part $3_1$ of the end 3 and which are disposed on either side of the plane of flattening, are applied against one another and the flattened sleeve obturates said part $3_1$ almost completely.

The connecting rod of which the two ends may be treated in the same way, is introduced into an oven for an hour and a half, for example, whilst the interior of said oven is taken to 120° C. Under the effect of heat, the air cells of said plug 11 expand and the same applies to the intumescent film 13. The sleeve 12 of preimpregnated fabric located in portions $3_2$ and $3_3$ is therefore applied against the inner wall of the end 3, whilst the resin impregnating said fabric polymerises. Thus an excellent adherence is obtained of the fabric of the sleeve 12 on the inner wall of the tubular end 3. Moreover, the plug 11 prevents the air contained in the connecting rod from creating excess pressures in said end 3 during the polymerisation of the resin, which would result in said resin being driven out, thus creating porosities in the laminate formed by winding said fabric. On the contrary, this air exerts a pressure on the plugs, thus promoting the application of the sleeve 12 against the portions $3_3$ and $3_3$.

The intumescent film 13 makes it possible to create a pressure in the cavity remaining between the plug 11 and the flattened part $3_1$. This cavity is rendered necessary by the fact that the end of the plug 11 cannot be compressed to a substantially zero diameter and conserve a substantially circular shape.

After heating, the connecting rod according to the invention is cooled for a determined period of time, for example from 15 to 30 minutes, until its temperature is less than 40° C.

An eye 14 is then pierced and bored in the flattened portion $3_1$ and the latter is then routed to a shape as may be seen in FIG. 3.

Figure 4:
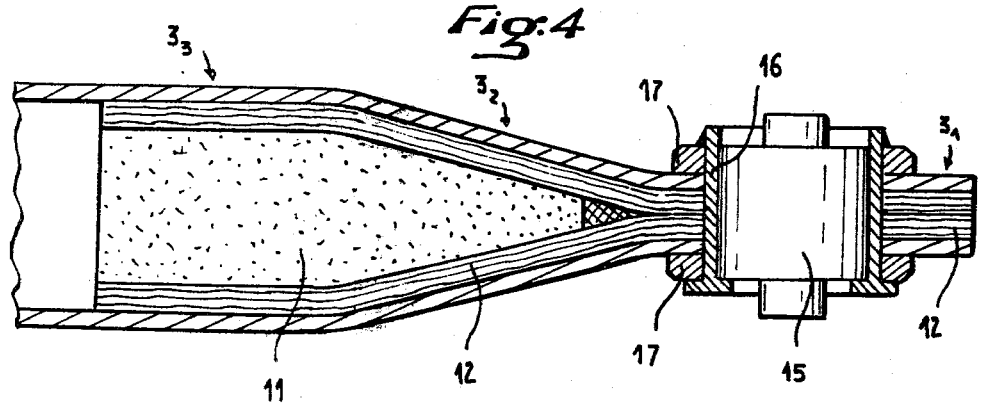
FIG. 4 is a section along IV-IV of FIG. 3.

A swivel joint 15 or the hub of a shaft are then crimped, in known manner, in the eye 14 via a metal ring 16 and two washers 17, as may be seen in FIG. 4.

Figure 5:
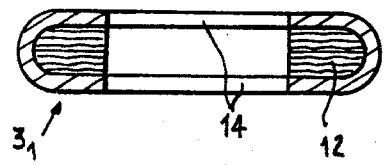
FIG. 5 is a section along line V-V of FIG. 3, the connecting member being assumed not to have been mounted.

FIG. 5 shows a section through the flattened part $3_1$. This view shows that the working part of the end piece according to the invention may have a large section, as, due to its low weight and its shaping by polymerisation, the fabric-resin laminate part may have a thickness much greater than that of a metallic piece whose weight and possibilities of shaping by flattening limit the thickness. A section of working surface is thus obtained, two to four times greater than the corresponding section of the known connecting rods previously described, and consequently a better axial static resistance of the connecting rod is obtained.

Moreover, due to the laminate structure of the sleeve, the connecting rods according to the invention have an excellent fatigue resistance. Finally, their ends are perfectly tight.

The programme for manufacturing connecting rods with tubular rod and with two similar ends, in accordance with the process of the invention, may be as follows:

- determination of the length of the tubular body (tubes made of AG5 alloy for example)
- sulfochromic scouring of said body,
- production and positioning of the foam plugs on the needles 8
- winding of the fabric-resin laminate sleeves
- fitting of the ends of the tubular body on mandrels 4 with bag 6
- placing the bags under air pressure
- deflation of the bags and dismantling of the tubular body from said mandrel
- crushing of the ends of the tubular body
- polymerisation of the resin of the sleeves in an oven
- piercing, boring, routing of the flattened ends
- crimping of the equipment on the flattened ends.

It is, of course, possible to reverse the order of two or more phases of the above process without departing from the scope of the invention.

The length of said metallic tubes is determined by the desired length between axes of the connecting rod, taking into account the variation in length produced by the crushing of the ends.

We claim:

1. A process for fitting a connecting member at a tubular deformable end of a light weight metal shaft, comprising the steps of:
    inserting into said tubular end a sleeve formed of resistant fibers impregnated with polymerizable resin, the outer surface of said sleeve being in substantial contact with the inner wall of said end;
    flattening a portion of said end sufficiently to bring opposite inner walls of said sleeve into substantial contact with each other; and
    polymerizing said resin to seal the interior of said rod against entry of air or other gas.

2. A process in accordance with claim 1 wherein the length of said sleeve is greater than the length of said portion which is flattened, and wherein said sleeve is filled over a portion of its length with a plug of deformable closed-cell foamed plastics material, said plug being spaced from the end of said shaft and having a length at least equal to a section of said rod which joins the flattened portion thereof to the undeformed remainder of said rod.

3. A process in accordance with claim 2 wherein said plug is formed of a polymethacrylimide foam.

4. A process in accordance with claim 3, wherein said sleeve is formed and inserted within said end by:
    positioning said plug adjacent to and coaxial with a cylindrical inflatable bag,
    winding said resin-impregnated fibers circumferentially over both said plug and said bag,
    inserting said fiber-covered plug and bag into said tubular end,
    inflating said bag to apply said fibers to the inner wall of said tubular end, and
    deflating and removing said bag from said end.

5. A process in accordance with claim 4 wherein said bag is annular in form and is mounted on and encircles a cylindrical mandrel, said mandrel further comprising means for maintaining said plug coaxial with said bag.

6. A process in accordance with claim 1 which includes the additional step of locating a material which expands when heated between said plug and the section of said sleeve which is intended to be flattened.

7. A light weight metal rod having a connecting member fitted at an end thereof by the process of any one of claims 1 to 5.

* * * * *